United States Patent
Kim (10) Patent No.: US 10,933,906 B2
(45) Date of Patent: Mar. 2, 2021

(54) VIBRATION REDUCTION APPARATUS AND METHOD FOR MOTOR DRIVEN POWER STEERING

(71) Applicant: HYUNDAI MOBIS CO., LTD., Seoul (KR)

(72) Inventor: Tae Hong Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 416 days.

(21) Appl. No.: 16/046,997

(22) Filed: Jul. 27, 2018

(65) Prior Publication Data

US 2019/0031230 A1    Jan. 31, 2019

(30) Foreign Application Priority Data

Jul. 28, 2017  (KR) .................. 10-2017-0096238

(51) Int. Cl.
*B62D 5/04* (2006.01)

(52) U.S. Cl.
CPC ......... *B62D 5/0472* (2013.01); *B62D 5/0481* (2013.01)

(58) Field of Classification Search
CPC ............................ B62D 5/0472; B62D 5/0481
See application file for complete search history.

(56) References Cited

U.S. PATENT DOCUMENTS

| | | | |
|---|---|---|---|
| 8,267,220 B2 | 9/2012 | Sugiyama et al. | |
| 8,554,417 B2 | 10/2013 | Yu | |
| 8,818,630 B2 * | 8/2014 | Kobayashi | B60W 10/08 701/38 |
| 9,045,033 B2 * | 6/2015 | Kinoshita | B60W 10/26 |
| 10,023,192 B2 * | 7/2018 | Igarashi | B60W 30/025 |
| 10,618,549 B2 * | 4/2020 | Kim | B62D 5/0472 |
| 2010/0268421 A1 | 10/2010 | Yang et al. | |
| 2011/0266760 A1 * | 11/2011 | Itabashi | B60L 15/2054 280/5.507 |
| 2017/0144697 A1 * | 5/2017 | Lim | B62D 6/008 |

FOREIGN PATENT DOCUMENTS

| | | |
|---|---|---|
| KR | 10-0961606 | 6/2010 |
| KR | 10-2010-0114995 | 10/2010 |

OTHER PUBLICATIONS

Office Action dated Aug. 19, 2020 from Chinese Patent Application No. 201810838106.7.

* cited by examiner

*Primary Examiner* — Ramsey Refai
(74) *Attorney, Agent, or Firm* — H.C. Park & Associates, PLC (57) ABSTRACT

A damping reduction apparatus for a motor driven power steering (MDPS) may include: a natural vibration frequency detection unit configured to detect a natural vibration frequency from a motor current by variably controlling a bandwidth according to a steering condition; a damping compensation unit configured to additionally compensate for a damping value outputted from a damping unit according to a vehicle speed; and a compensation output unit configured to inversely compensate for an output of the MDPS according to the natural vibration frequency outputted from the natural vibration frequency output unit, and add the compensation to an output of the damping compensation unit.

20 Claims, 5 Drawing Sheets

VIBRATION REDUCTION APPARATUS AND METHOD FOR MOTOR DRIVEN POWER STEERING

CROSS-REFERENCES TO RELATED APPLICATIONS

This application claims priority from and the benefit of Korean Application No. 10-2017-0096238, filed on Jul. 28, 2017, which is hereby incorporated by reference for all purposes as if set forth herein.

BACKGROUND

Field

Exemplary embodiments relate to a vibration reduction apparatus and method for a motor driven power steering (MDPS), and more particularly, to a vibration reduction apparatus and method of an MDPS, which can detect the natural vibration frequency of a motor current, and reduce steering wheel shimmy or the like.

Discussion of the Background

The MDPS represents a system that assists a driver's handling by providing an assist torque in a steering direction using an electric motor. Depending on a driving condition of a vehicle, the MDPS can automatically control the operation of the electrical motor, thereby improving the steering performance and steering feel.

When the driver releases the steering wheel by determining that the vehicle was turned to a desired extent after a steering input was applied to steer the vehicle, the steering wheel returns to the center through a returning operation. The returning operation of the steering wheel is performed by the self alignment torque of tires. Typically, when the vehicle is turned at a speed of 5 km/h to 30 km/h, the returning operation may be usefully applied. However, the self alignment torque applied to the steering wheel may not be enough to return the steering wheel to the center because a steering angle remains due to a frictional force of the steering system.

Thus, a separate function of assisting the returning operation is inevitably provided to completely return the steering wheel to the center. Therefore, the MDPS applies a returning torque calculated based on the steering angle, and assists the returning operation of the steering wheel, thereby improving the returning performance.

The related art is disclosed in Korean Publication Patent No. 2010-0114995 published on Oct. 27, 2010 and entitled "Steering return method of MDPS".

In the MDPS according to the related art, however, steering wheel shimmy may be caused by a wheel imbalance or an eccentricity or deformation of a disk wheel while the vehicle is driven. Furthermore, natural vibration may occur due to a separation or distortion of a mechanical part.

The above information disclosed in this Background section is only for enhancement of understanding of the background of the invention and, therefore, it may contain information that does not constitute prior art.

SUMMARY

Exemplary embodiments of the present invention provide a vibration reduction apparatus and method for an MDPS, which can extract a natural vibration frequency at which vibration is caused, and inversely compensate for an output of the MDPS based on the natural vibration frequency, thereby reducing vibration of the MDPS.

In one embodiment, a damping reduction apparatus for a motor driven power steering (MDPS) may include: a natural vibration frequency detection unit configured to detect a natural vibration frequency from a motor current by variably controlling a bandwidth according to a steering condition; a damping compensation unit configured to additionally compensate for a damping value outputted from a damping unit according to a vehicle speed; and a compensation output unit configured to inversely compensate for an output of the MDPS according to the natural vibration frequency outputted from the natural vibration frequency output unit, and add the compensation to an output of the damping compensation unit.

The damping compensation unit may include: a gain adjusting unit configured to detect a vehicle speed gain which is preset according to the vehicle speed; and a gain tuning unit configured to tune a damping gain by additionally reflecting the vehicle speed gain outputted from the gain adjusting unit into the output of the damping unit, and compensate for the output of the damping unit using the tuned damping gain.

The vehicle speed gain may be set according to a preset vehicle speed based on the characteristics of the vehicle.

The natural vibration frequency detection unit may include: a natural vibration frequency tuning unit configured to detect a natural vibration frequency according to the vehicle speed; a bandwidth tuning unit configured to vary the bandwidth according to a column speed; a phase control unit configured to compensate for a phase difference between the motor current and the MDPS output; and a filter configured to filter an output of the phase control unit according to outputs of the natural vibration frequency tuning unit and the bandwidth tuning unit.

The natural vibration frequency detected by the natural vibration frequency detection unit may be differently set depending on the types of vehicles.

The phase control unit may include: a phase shift detector configured to detect a phase shift between the motor current and the MDPS output; and a phase shift compensator configured to compensate for the phase of the motor current according to the phase shift detected by the phase shift detector.

The phase shift detector may adjust the phase of the motor current according to the ratio of a boost gain to a column torque.

The damping reduction apparatus may further include a decoupling unit configured to limit the output of the natural vibration frequency detection unit.

The decoupling unit may include a first decoupling gain adjuster configured to limit the output of the natural vibration frequency detection unit when a column speed is equal to or greater than a preset column speed value.

The decoupling unit may include a second decoupling gain adjuster configured to limit the output of the natural vibration frequency detection unit when the MDPS output based on a column torque is equal to or greater than a preset output value.

In another embodiment, a damping reduction method for an MDPS may include: detecting, by a natural vibration frequency detection unit, a natural vibration frequency from a motor current by variably controlling a bandwidth according to a steering condition; additionally compensating for, by a damping compensation unit, a damping value outputted from a damping unit according to a vehicle speed; and inversely compensating for, by a compensation output unit, an output of the MDPS according to the natural vibration frequency outputted from the natural vibration frequency output unit, and adding the compensation to an output of the damping compensation unit.

In the compensating for the damping value outputted from the damping unit, a gain adjusting unit may detect a vehicle speed gain which is preset according to the vehicle speed, and a gain tuning unit may tune a damping gain by additionally reflecting the vehicle speed gain outputted from the gain adjusting unit into the output of the damping unit, and compensate the output of the damping unit using the tuned damping gain.

The vehicle speed gain may be set according to a preset vehicle speed based on the characteristics of the vehicle.

In the detecting of the natural vibration frequency from the motor current, a natural vibration frequency tuning unit may detect the natural vibration frequency according to the vehicle speed, a bandwidth tuning unit may vary a bandwidth according to a column speed, a phase control unit may compensate for a phase difference between the motor current and the MDSP output, and a filter may filter an output of the phase control unit according to outputs of the natural vibration frequency tuning unit and the bandwidth tuning unit.

The natural vibration frequency detected by the natural vibration frequency detection unit may be differently set depending on the types of vehicles.

The phase control unit may detect a phase shift between the motor current and the MDPS output, and compensate for the phase of the motor current according to the detected phase shift.

The phase control unit may adjust the phase of the motor current according to the ratio of a boost gain to a column torque.

The damping reduction method may further include limiting, by a decoupling unit, the output of the natural vibration frequency detection unit.

In the limiting of the output of the natural vibration frequency detection unit, the decoupling unit may limit the output of the natural vibration frequency detection unit when a column speed is equal to or greater than a preset column speed value.

In the limiting of the output of the natural vibration frequency detection unit, the decoupling unit may limit the output of the natural vibration frequency detection unit when the MDPS output based on a column torque is equal to or greater than a preset output value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a vibration reduction apparatus and method of a motor driven power steering (MDPS) in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 1:
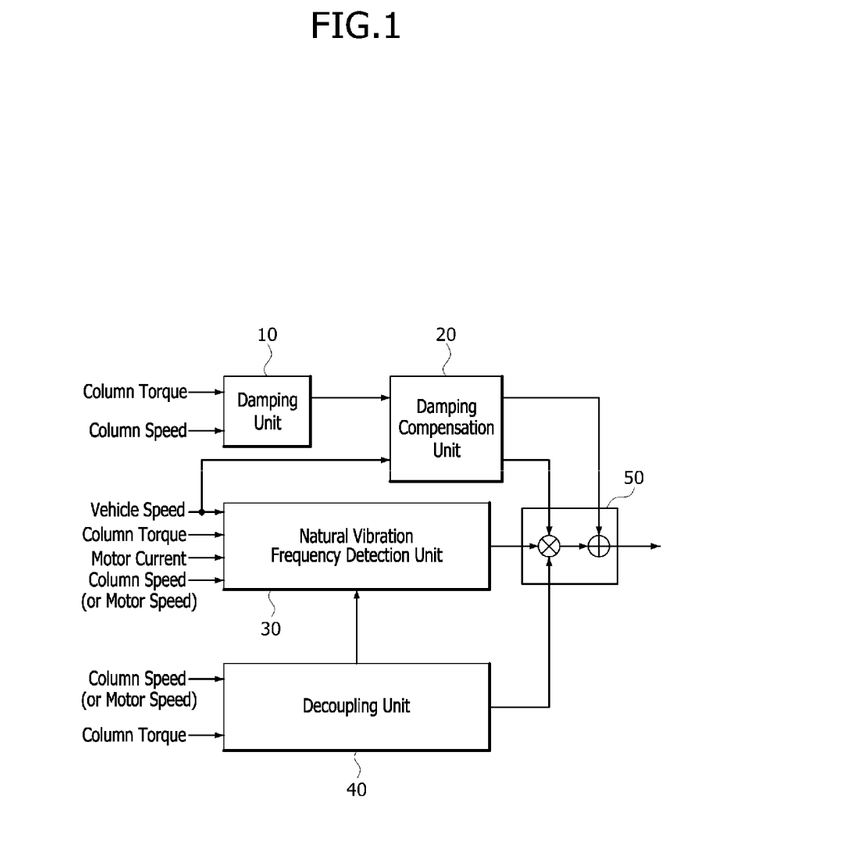
FIG. 1 is a block diagram illustrating a vibration reduction apparatus of a motor driven power steering (MDPS) in accordance with an embodiment of the present invention.
Figure 2:
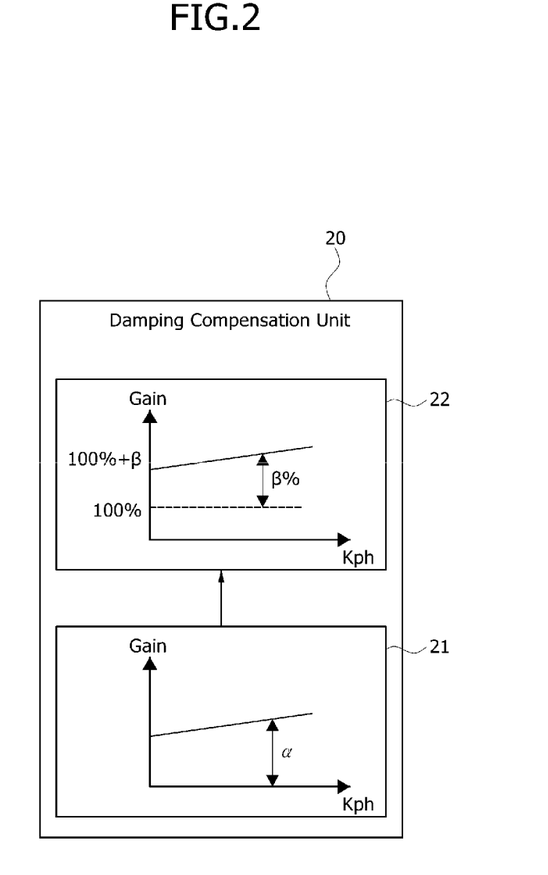
FIG. 2 is a block diagram illustrating a damping compensation unit in accordance with the embodiment of the present invention.
Figure 3:
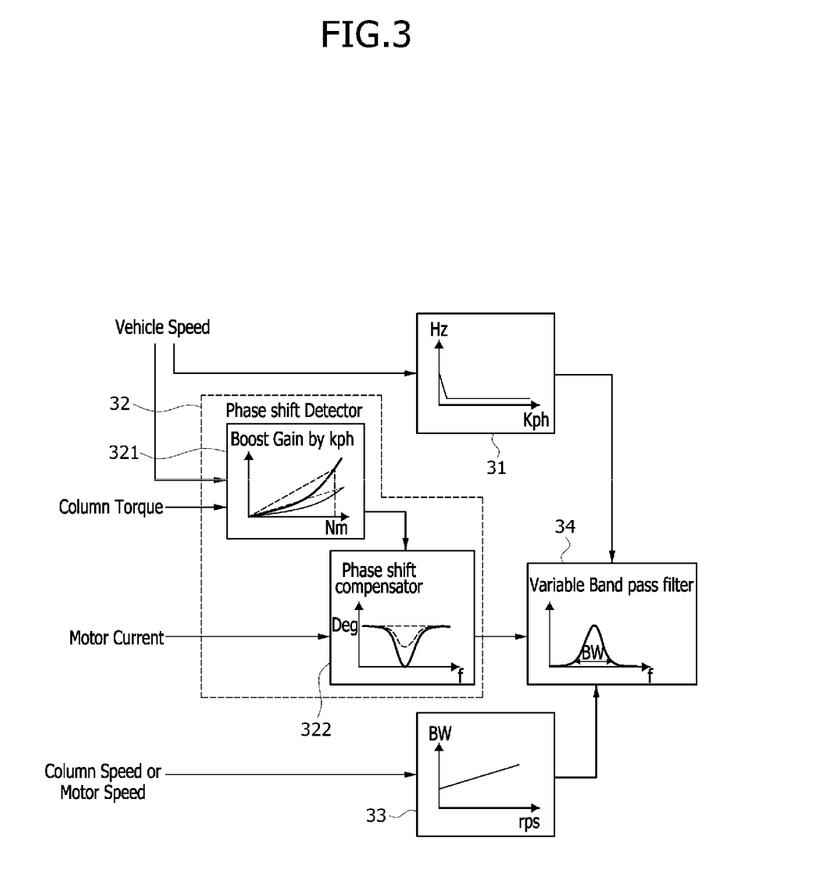
FIG. 3 is a block diagram illustrating a natural vibration frequency detection unit in accordance with the embodiment of the present invention.
Figure 4:
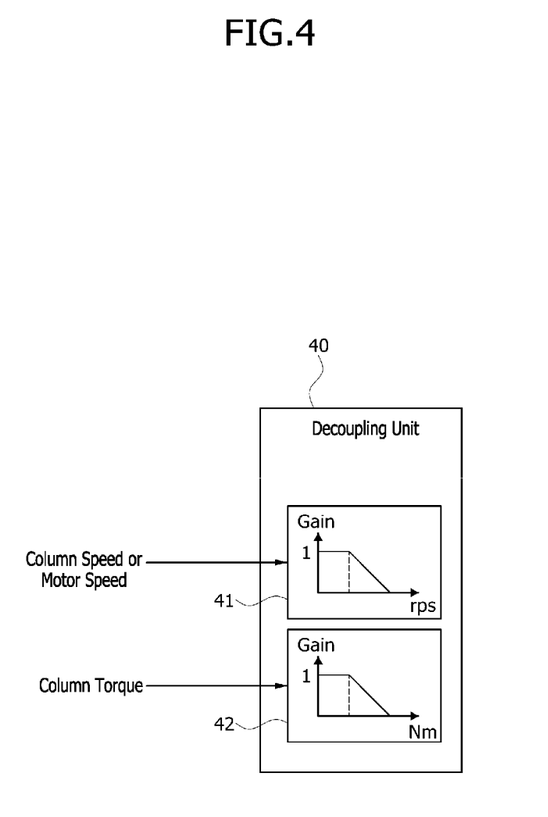
FIG. 4 is a block diagram illustrating a decoupling unit in accordance with an embodiment of the present invention.

FIG. 1 is a block diagram illustrating a vibration reduction apparatus for an MDPS in accordance with an embodiment of the present invention, FIG. 2 is a block diagram illustrating a damping compensation unit in accordance with the embodiment of the present invention, FIG. 3 is a block diagram illustrating a natural vibration frequency detection unit in accordance with the embodiment of the present invention, and FIG. 4 is a block diagram illustrating a decoupling unit in accordance with an embodiment of the present invention.

Referring to FIG. 1, the vibration reduction apparatus for an MDPS in accordance with an embodiment of the present invention may include a damping unit 10, a damping compensation unit 20, a natural vibration frequency detection unit 30, a decoupling unit 40 and a compensation output unit 50.

The damping unit 10 may calculate a damping force of the MDPS according to a vehicle speed, using a column speed or motor speed and a column toque. In this case, the damping unit 10 may calculate a damping force suitable for each condition in operation of the vehicle by adjusting a gain based on the column speed or motor speed and the column torque.

The MDPS may refer to a system that assists a steering force using a motor. The MDPS may include a column-MDPS (C-MDPS) having a motor coupled to a steering shaft (not illustrated but described below in exemplary embodiments), a pinion-MDPS (P-MDPS) having a motor coupled to a pinion gear of a steering wheel shaft (not illustrated), and a rack-MDPS (R-MDPS) having a motor coupled to a rack gear (not illustrated).

The damping compensation unit 20 may additionally compensate for the damping value of the damping unit 10, depending on the vehicle speed.

Typically, a steering wheel shimmy occurs due to a wheel imbalance or an eccentricity or deformation of a disk wheel in operation of the vehicle. At a specific vehicle speed, a relatively large shimmy may occur.

The damping compensation unit 20 may additionally compensate for the damping force by tuning a damping gain depending on the vehicle speed, in addition to the output of the damping unit 10, i.e. the damping force.

Referring to FIG. 2, the damping compensation unit 20 may include a gain adjusting unit 21 and a gain tuning unit 22.

The gain adjusting unit 21 may detect a vehicle speed gain $\alpha$ which is preset according to the vehicle speed. The vehicle speed gain of the gain adjusting unit 21 may be set in advance, and have various values depending on the preset vehicle speed based on the characteristics of the vehicle. Typically, the steering wheel shimmy which occurs due to a wheel imbalance or an eccentricity or deformation of the disk wheel in operation of the vehicle and the natural vibration which occurs due to a separation or distortion of a mechanical part may differently appear depending on the type or size of the vehicle and the mechanical structure. Furthermore, the steering wheel shimmy and the natural vibration may differently appear at a specific vehicle speed depending on the characteristics of the vehicle. Thus, the vehicle speed gain may be set to various values depending on the preset vehicle speed based on the characteristics of the vehicle, in consideration of the characteristics of the vehicle or the specific vehicle speed.

The gain tuning unit 22 may newly tune the damping gain $\beta$ by additionally reflecting the vehicle speed gain $\alpha$ detected by the gain adjusting unit 21 into the damping gain of the damping force outputted from the damping unit 10, and compensate for the damping force using the tuned damping gain $\beta$.

Therefore, the damping compensation unit 20 can additionally compensate for the existing damping gain in consideration of various vibrations which may occur depending on the vehicle speed, thereby improving the vibration reduction effect.

The natural vibration frequency detection unit 30 may variably control a bandwidth according to a steering condition, and detect a natural vibration frequency from a motor current (not illustrated), the natural vibration frequency causing vibration.

Referring to FIG. 3, the natural vibration frequency detection unit 30 may include a natural vibration frequency tuning unit 31, a bandwidth tuning unit 33, a phase control unit 32 and a filter 34.

The natural vibration frequency tuning unit 31 may detect a natural vibration frequency according to the vehicle speed.

Typically, each vehicle has a natural vibration frequency which changes according to its vehicle speed. Therefore, the natural vibration frequency tuning unit 31 may previously store a natural vibration frequency at each vehicle speed of the corresponding vehicle, detect a natural vibration frequency corresponding to an input vehicle speed, and effectively extract the natural vibration frequency at each vehicle speed. Since the natural vibration frequency is differently set depending on the types of vehicles, the natural vibration frequency can be accurately detected according to the vehicle speed in each of the vehicles.

The phase control unit 32 may compensate for a phase difference between the motor current and an output of the MDSP, i.e. assist torque. The phase control unit 32 may include a phase shift detector 321 and a phase shift compensator 322.

Typically, the motor current and the output of the MDPS may have different phases depending on the ratio of the output of the MDPS to a vehicle load or the ratio of the output of the MDPS to the motor current. When the phase of the motor current is different from the phase of the MDPS output, the vibration reduction effect may be degraded. Therefore, in order to more effectively control the vibration reduction effect, the natural vibration frequency of the motor current needs to be 180 out of phase with the output of the MDPS, in which an actual MDPS delay is considered.

The phase shift detector 321 may generate a vibration compensation output in which a mechanical operation delay caused by a mechanical system load is considered, by adjusting the phase of the motor current according to the ratio of a column torque to a boost gain.

Typically, the response speed of a mechanical system such as a motor is increased when the boost gain is relatively high, but decreased when the boost gain is relatively low. Therefore, when the boost gain is relatively low, it is necessary to compensate for the motor current by a phase to cause a delay of the mechanical system such as a motor.

For example, when a boost curve is steep, a considerable system operation delay may not occur in the case where an assist output is higher than an input column torque. However, as the vehicle speed is increased, the steering feel needs to be set to a stiffer feel in order to secure a driver's stability. Therefore, the boost curve may be lowered with the increase of the vehicle speed. Thus, since a sufficient assist force is not generated during the driver's steering operation, serious mechanical distortion may occur to cause a mechanical system operation delay. Depending on the slope of the boost curve, the phase of the motor current may be adjusted to generate a vibration compensation output which coincides with the phase timing at which vibration actually occurs. The phase shift detector 321 for phase adjustment may include a lead-lag filter, low pass filter or high pass filter.

In order to compensate for the phase by the above-described delay, the phase shift detector 321 may detect the slope of the boost gain with respect to the column torque, detect a phase shift between the motor current and the MDPS output based on the slope of the boost gain, and input the detected phase shift to the phase shift compensator 322.

The phase shift compensator 322 may compensate for the phase of the motor current according to the phase shift detected by the phase shift detector 321, thereby further improving the noise reduction effect.

The bandwidth tuning unit 33 may vary a bandwidth according to the column speed.

When the column speed gets higher, noise may be increased. On the other hand, when the column speed gets lower, noise may be decreased. Therefore, the bandwidth tuning unit 33 may tune the bandwidth of the filter 34 by tuning the bandwidth according to the column speed.

The filter 34 may filter the output of the phase control unit 32 depending on the outputs of the natural vibration frequency tuning unit 31 and the bandwidth tuning unit 33.

In this case, while the bandwidth is tuned by the bandwidth tuning unit 33, the filter 34 may adjust only the center frequency depending on the column speed, and thus extract different natural vibration frequencies depending on the column speed. That is, since noises close to the natural vibration frequency are further amplified when the column speed is high, the filter unit 34 may narrow the bandwidth during low-speed steering, and widen the bandwidth during high-speed steering, in order to effectively extract the natural vibration frequency.

Furthermore, since the natural vibration frequency tuning unit 31 detects the natural vibration frequency which is detected according to the vehicle speed, the filter 34 can detect the natural vibration frequency more effectively.

The decoupling unit 40 may limit the output of the natural vibration frequency detection unit 30 according to the column speed or the column torque, and include first and second decoupling gain adjusters 41 and 42.

The first decoupling gain adjuster 41 may limit the output of the natural vibration frequency detection unit 30 by reducing a decoupling gain when the column speed is equal to or greater than a preset column speed value. This is because, since a driver does not feel vibration when the column speed is relatively very high, vibration compensation for the vibration does not need to be limited.

The second decoupling gain adjuster 42 may limit the output of the natural vibration frequency detection unit 30 by reducing the decoupling gain when the MDPS output based on the column torque is equal to or greater than a preset output value. This is because, since the driver does not feel vibration when the MDPS output is relatively very high, vibration compensation for the vibration does not need to be limited.

The compensation output unit 50 may compensate for the damping value by not only inversely compensating for the vibration depending on the output of the natural vibration frequency detection unit 30, but also additionally reflecting the damping gain compensated by the damping compensation unit 20.

That is, the compensation output unit 50 may compensate for the vibration by reflecting the vehicle speed gain $\alpha$ set by the gain adjusting unit 21 into the natural vibration frequency detected by the natural vibration frequency detection unit 30, i.e. the magnitude of the vibration, and add the compensated vibration to the output of the damping compensation unit 20, thereby outputting the vibration-compensated damping value.

In this case, the compensation output unit 50 may calculate an additional damping gain $\beta$ for a shortage in the vibration reduction effect by considering the ratio of the vehicle speed gain $\alpha$ to the maximum output of the MDPS, and compensate for the damping force based on the damping gain $\beta$. The damping gain $\beta$ may be increased in proportion to the vehicle speed gain $\alpha$ for each vehicle speed, or configured in the formed of a lookup table in order to tune the damping value according to each vehicle speed.

When the decoupling gain is inputted from the first or second decoupling gain adjuster 41 or 42, the compensation output unit 50 may limit the output of the natural vibration frequency detection unit 30 by reflecting the decoupling gain. That is, when the column speed is equal to or greater than the preset column speed value or the MDPS output based on the column toque is equal to or greater than the preset output value, the compensation output unit 50 may limit the output of the natural vibration frequency detection unit 30 by reflecting the decoupling gain into the output of the natural vibration frequency detection unit 30.

Hereafter, a vibration reduction method of an MDPS in accordance with an embodiment of the present invention will be described in detail with reference to FIG. 5.

Figure 5:
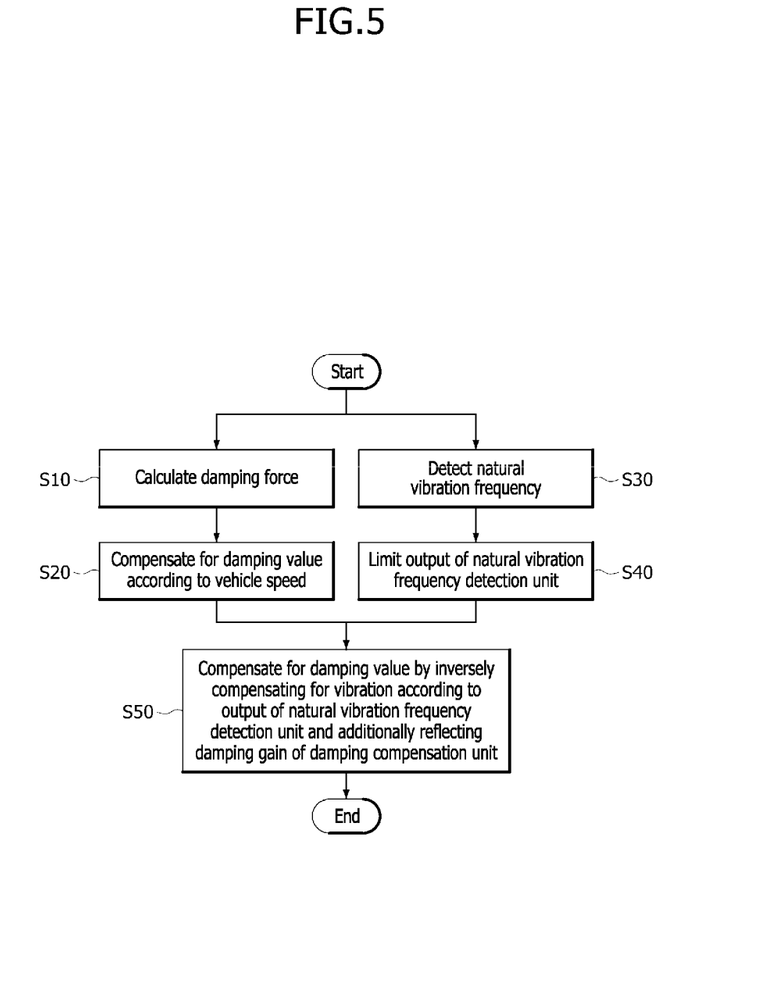
FIG. 5 is a flowchart illustrating a vibration reduction method of an MDPS in accordance with an embodiment of the present invention.

FIG. 5 is a flowchart illustrating the vibration reduction method of an MDPS in accordance with the embodiment of the present invention.

Referring to FIG. 5, the damping unit 10 may calculate a damping force of the MDPS according to a vehicle speed, using a column speed or motor speed and a column toque, at step S10. In this case, the damping unit 10 may calculate a damping force suitable for each condition in operation of the vehicle, by adjusting a gain based on the column speed or motor speed and the column torque.

As the damping force is calculated by the damping unit 10, the damping compensation unit 20 may additionally compensate for the damping value of the damping unit 10 according to the vehicle speed, at step S20.

In this case, the gain adjusting unit 21 may detect a vehicle speed gain $\alpha$ which is preset according to the vehicle speed, and the gain tuning unit 22 may newly tune a damping gain $\beta$ by additionally reflecting the vehicle speed gain $\alpha$ detected by the gain adjusting unit 21 into the damping gain of the damping force outputted from the damping unit 10, and compensate for the damping force using the damping gain $\beta$.

The natural vibration frequency detection unit 30 may variably control a bandwidth depending on a steering condition, and detect a natural vibration frequency from a motor current (not illustrated), the natural vibration frequency causing vibration, at step S30.

In this case, the natural vibration frequency tuning unit 31 may detect the natural vibration frequency according to the vehicle speed, the phase control unit 32 may compensate for a phase difference between the motor current and an MDPS output, i.e. assist torque, and the bandwidth tuning unit 33 may vary the bandwidth according to the column speed.

Furthermore, the filter 34 may filter the output of the phase control unit 32 according to the outputs of the natural vibration frequency tuning unit 31 and the output of the bandwidth tuning unit 33, and the natural vibration frequency tuning unit 31 may detect the natural vibration frequency which is detected according to the vehicle speed. Therefore, the natural vibration frequency can be more effectively detected.

As the natural vibration frequency is detected by the natural vibration frequency detection unit 30, the decoupling unit 40 may limit the output of the natural vibration frequency detection unit 30 depending on the column speed or the column torque, at step S40.

In this case, the first decoupling gain adjuster 41 may reduce the decoupling gain when the column speed is equal to or greater than the preset column speed value, and the second decoupling gain adjuster 42 may reduce the decoding gain when the MDSP output based on the column torque is equal to or greater than the preset output value.

Then, the compensation output unit 50 may compensate for the damping value by not only inversely compensating for the vibration according to the output of the natural vibration frequency detection unit 30, but also additionally reflecting the damping gain compensated by the damping compensation unit 20, step S50.

That is, the compensation output unit 50 may compensate for the vibration by reflecting the vehicle speed gain α set by the gain adjusting unit 21 into the natural vibration frequency detected by the natural vibration frequency detection unit 30, i.e. the magnitude of the vibration, add the compensated vibration to the output of the damping compensation unit 20, calculate an additional damping gain β for a shortage of the vibration reduction effect in consideration of the ratio of the vehicle speed gain α to the maximum output of the MDPS, and compensate for the damping force based on the damping gain β.

Furthermore, when the column speed is equal to or greater than the preset column speed value or the MDPS output based on the column toque is equal to or greater than the preset output value, the compensation output unit 50 may limit the output of the natural vibration frequency detection unit 30 by reflecting the decoupling gain into the output of the natural vibration frequency detection unit 30.

As such, the vibration reduction apparatus and method for an MDPS in accordance with the embodiments of the present invention can extract the natural vibration frequency which causes vibration, and inversely compensate for the output of the MDPS based on the natural vibration frequency, thereby reducing a steering wheel shimmy caused by a wheel imbalance or an eccentricity or deformation of the disk wheel in operation of the vehicle and natural vibration caused by a separation or distortion of a mechanical part.

Although exemplary embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A damping reduction apparatus for a motor driven power steering (MDPS), comprising:
a natural vibration frequency detection unit configured to detect a natural vibration frequency from a motor current by variably controlling a bandwidth according to a steering condition;
a damping compensation unit configured to additionally compensate for a damping value outputted from a damping unit according to a vehicle speed; and
a compensation output unit configured to inversely compensate for an output of the MDPS according to the natural vibration frequency outputted from the natural vibration frequency output unit, and add the compensation to an output of the damping compensation unit.

2. The damping reduction apparatus of claim 1, wherein the damping compensation unit comprises:
a gain adjusting unit configured to detect a vehicle speed gain which is preset according to the vehicle speed; and
a gain tuning unit configured to tune a damping gain by additionally reflecting the vehicle speed gain outputted from the gain adjusting unit into the output of the damping unit, and compensate for the output of the damping unit using the tuned damping gain.

3. The damping reduction apparatus of claim 2, wherein the vehicle speed gain is set according to a preset vehicle speed based on the characteristics of the vehicle.

4. The damping reduction apparatus of claim 2, wherein the natural vibration frequency detection unit comprises:
a natural vibration frequency tuning unit configured to detect a natural vibration frequency according to the vehicle speed;
a bandwidth tuning unit configured to vary the bandwidth according to a column speed;
a phase control unit configured to compensate for a phase difference between the motor current and the MDPS output; and
a filter configured to filter an output of the phase control unit according to outputs of the natural vibration frequency tuning unit and the bandwidth tuning unit.

5. The damping reduction apparatus of claim 4, wherein the natural vibration frequency detected by the natural vibration frequency detection unit is differently set depending on the types of vehicles.

6. The damping reduction apparatus of claim 4, wherein the phase control unit comprises:
a phase shift detector configured to detect a phase shift between the motor current and the MDPS output; and
a phase shift compensator configured to compensate for the phase of the motor current according to the phase shift detected by the phase shift detector.

7. The damping reduction apparatus of claim 6, wherein the phase shift detector adjusts the phase of the motor current according to the ratio of a boost gain to a column torque.

8. The damping reduction apparatus of claim 1, further comprising a decoupling unit configured to limit the output of the natural vibration frequency detection unit.

9. The damping reduction apparatus of claim 8, wherein the decoupling unit comprises a first decoupling gain adjuster configured to limit the output of the natural vibration frequency detection unit when a column speed is equal to or greater than a preset column speed value.

10. The damping reduction apparatus of claim 8, wherein the decoupling unit comprises a second decoupling gain adjuster configured to limit the output of the natural vibration frequency detection unit when the MDPS output based on a column torque is equal to or greater than a preset output value.

11. A damping reduction method for a motor driven power steering (MDPS), comprising:

detecting, by a natural vibration frequency detection unit, a natural vibration frequency from a motor current by variably controlling a bandwidth according to a steering condition;

additionally compensating for, by a damping compensation unit, a damping value outputted from a damping unit according to a vehicle speed; and inversely compensating for, by a compensation output unit, an output of the MDPS according to the natural vibration frequency outputted from the natural vibration frequency output unit, and adding the compensation to an output of the damping compensation unit.

12. The damping reduction method of claim 11, wherein in the compensating for the damping value outputted from the damping unit, a gain adjusting unit detects a vehicle speed gain which is preset according to the vehicle speed, and a gain tuning unit tunes a damping gain by additionally reflecting the vehicle speed gain outputted from the gain adjusting unit into the output of the damping unit, and compensates for the output of the damping unit using the tuned damping gain.

13. The damping reduction method of claim 12, wherein the vehicle speed gain is set according to a preset vehicle speed based on the characteristics of the vehicle.

14. The damping reduction method of claim 12, wherein in the detecting of the natural vibration frequency from the motor current, a natural vibration frequency tuning unit detects the natural vibration frequency according to the vehicle speed, a bandwidth tuning unit varies a bandwidth according to a column speed, a phase control unit compensates for a phase difference between the motor current and the MDSP output, and a filter filters an output of the phase control unit according to outputs of the natural vibration frequency tuning unit and the bandwidth tuning unit.

15. The damping reduction method of claim 14, wherein the natural vibration frequency detected by the natural vibration frequency detection unit is set differently depending on the type of vehicle.

16. The damping reduction method of claim 14, wherein the phase control unit detects a phase shift between the motor current and the MDPS output, and compensates for the phase of the motor current according to the detected phase shift.

17. The damping reduction method of claim 16, wherein the phase control unit adjusts the phase of the motor current according to the ratio of a boost gain to a column torque.

18. The damping reduction method of claim 11, further comprising limiting, by a decoupling unit, the output of the natural vibration frequency detection unit.

19. The damping reduction method of claim 18, wherein in the limiting of the output of the natural vibration frequency detection unit, the decoupling unit limits the output of the natural vibration frequency detection unit when a column speed is equal to or greater than a preset column speed value.

20. The damping reduction method of claim 18, wherein, in the limiting of the output of the natural vibration frequency detection unit, the decoupling unit limits the output of the natural vibration frequency detection unit when the MDPS output based on a column torque is equal to or greater than a preset output value.

* * * * *